C. P. BROWNING.
SPROCKET AND CHAIN THEREFOR.
APPLICATION FILED AUG. 1, 1913.
1,101,398.
Patented June 23, 1914.
2 SHEETS—SHEET 1.
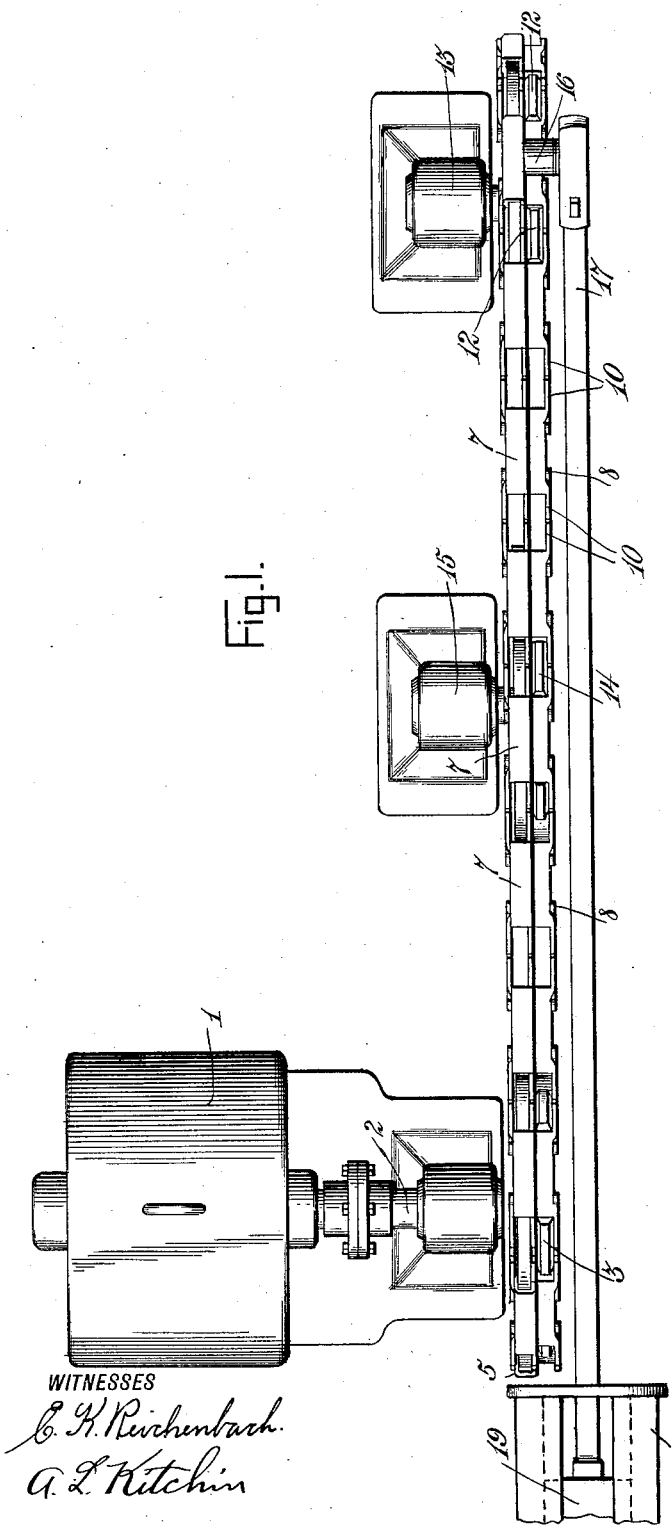
WITNESSES
INVENTOR
Charles P. Browning
BY
ATTORNEYS C. P. BROWNING.
SPROCKET AND CHAIN THEREFOR.
APPLICATION FILED AUG. 1, 1913.
1,101,398.
Patented June 23, 1914.
2 SHEETS—SHEET 2.
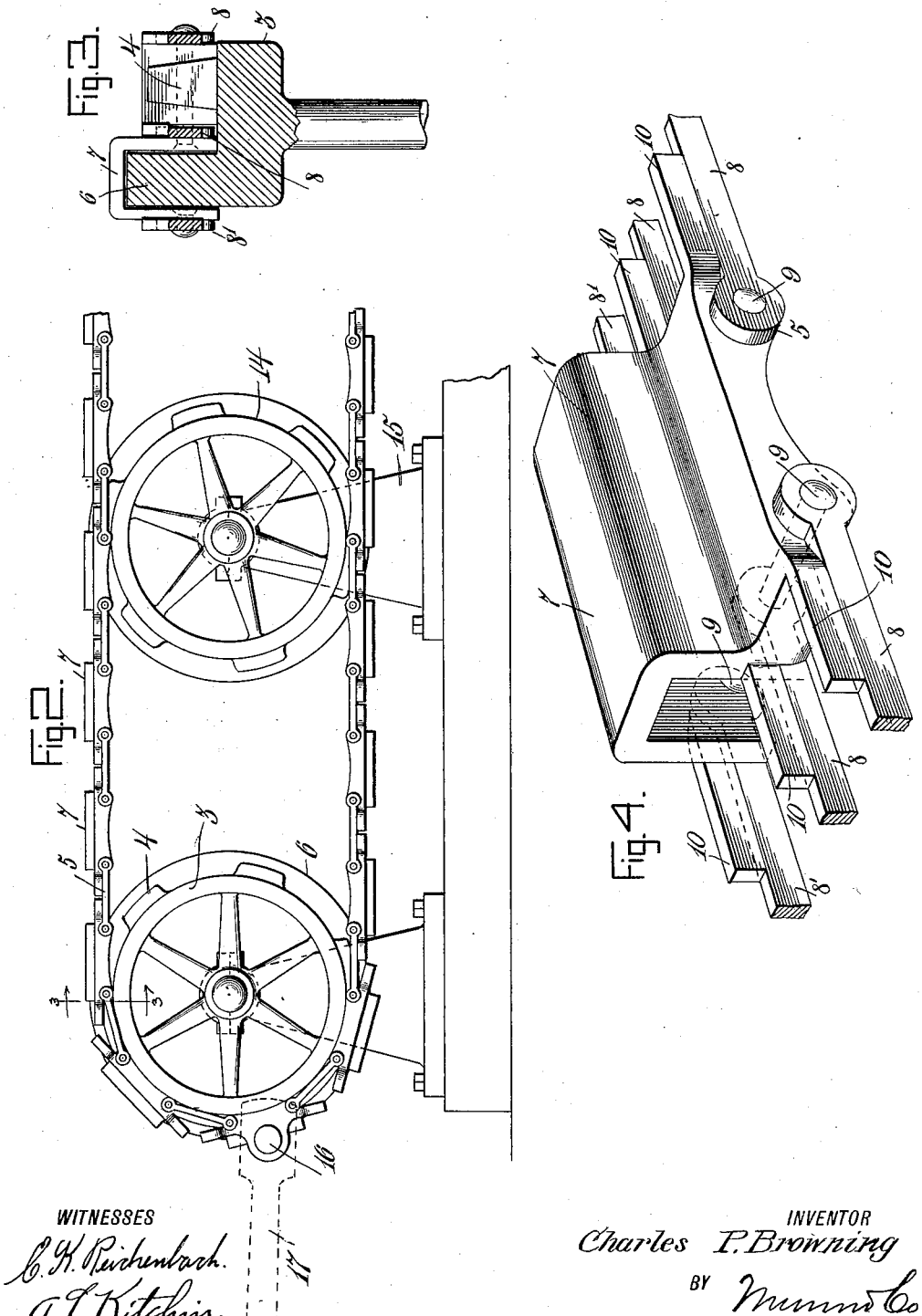
WITNESSES
C. K. Reichenbach.
A. L. Kitchin.
INVENTOR
Charles P. Browning
BY Munn & Co.
ATTORNEYS

UNITED STATES PATENT OFFICE.

CHARLES P. BROWNING, OF SALT POINT, NEW YORK.

SPROCKET AND CHAIN THEREFOR.

1,101,398. Specification of Letters Patent. Patented June 23, 1914.

Application filed August 1, 1913. Serial No. 782,429.

*To all whom it may concern:*

Be it known that I, CHARLES P. BROWNING, a citizen of the United States, and a resident of Salt Point, in the county of Dutchess and State of New York, have invented a new and Improved Sprocket and Chain Therefor, of which the following is a full, clear, and exact description.

This invention relates to an improved sprocket and chain therefor adapted particularly for translating rotary motion into reciprocating, whereby from a given rotation any desired reciprocating length of stroke may be provided.

The object in view is to provide a chain and a sprocket wheel therefor, the chain being formed with means for preventing the same from sagging, and with means co-acting with the flange on the sprocket wheel for withstanding side pressure.

In carrying out the object of the invention the power may be provided from any suitable source, such as a rotary motor which is connected in any desired manner with a suitable sprocket wheel over which the power chain is passed. One or more sprocket wheels are provided for carrying the loose end of the chain whereby the chain is properly guided and held in place. In forming the sprocket wheels and chain the same are made so that the chain will not appreciably bow or sag during the power stroke of the chain, and will not be accidentally removed from the sprocket wheels.

In the accompanying drawings—Figure 1 is a top plan view of an embodiment of the invention; Fig. 2 is an enlarged fragmentary side view of the structure shown in Fig. 1, the same being shown in a slightly different position; Fig. 3 is an enlarged fragmentary detailed section on line 3—3 of Fig. 2; Fig. 4 is an enlarged detailed perspective view of one of the links.

Referring to the accompanying drawings by numeral 1 indicates a power machine of any desired kind designed to rotate shaft 2 rigidly secured to sprocket wheel 3. Sprocket wheel 3 is provided with teeth 4 for properly interlocking with the links 5, and with a side flange 6 for co-acting with a bent-over or hooked portion 7 of the links 5. The links 5 are formed further with a hooked portion 7 and with a pivotal bar portion 8, the pivotal bar portion 8 fitting over the teeth 4 of sprocket wheel 3, while the pivotal bar portion 8' fits over the flange 6. Bar portions 8 and 8' are connected with the turned-over portions 7 by any desired means, as for instance rivets 9, as clearly shown in Fig. 4. In order that the chain on its power stroke cannot sag the turned-over portion 7 is provided with extensions 10 adapted to rest against the bar portions 8 and 8', whereby any sagging action is prevented, though the links are permitted to freely move around the sprocket wheel 3. At the end of the chain opposite sprocket 3 is a second sprocket 12 supported on a suitable support 13, and between sprockets 3 and 12 is arranged an intermediate sprocket 14 supported by a suitable bracket or support 15, sprockets 12 and 14 being formed similar to sprocket 3 so that no additional description thereof will be necessary. By this construction and arrangement when sprocket wheel 12 is moved by the power machine 1 the crank pin 16 secured to one of the turned-over links 7 is moved from sprocket wheel 12 over sprocket wheel 14 to sprocket wheel 3 and around sprocket wheel 3, after which it is again forced back to sprocket wheel 12. A movement of this kind will cause pin 16 to actuate the connecting rod 17 so as to cause the same to reciprocate or move back and forth, whereby proper reciprocatory movement may be secured for any desired purpose. Preferably, a guide 18 is provided in which a sliding member 19 is arranged which is moved back and forth by the connecting rod 17, and from which the power may be taken in any desired manner. This construction and arrangement is very desirable as any desired length of reciprocating stroke may be provided by merely lengthening or shortening the chain. By providing the flanges 6 any resistance to the crank pin 16 cannot twist or remove the chain sidewise from the sprocket wheels, as such twisting action is prevented by the use of the flanges 6.

Having thus described my invention what I claim as new and desire to secure by Letters Patent is—

1. In a device of the character described, a chain, said chain being formed with a plurality of links, each of said links being provided with an overhanging portion, and a sprocket co-acting with said links, said sprocket being provided with spurs for engaging said links, and a radial flange for engaging said overhanging portions.

2. In a device of the character described, a chain provided with a plurality of links, each of said links having pivotally mounted members between which the spurs of the sprocket wheel are adapted to pass, and a solid portion overlapping said pivotally mounted portions, whereby the pivotally mounted portions may be turned in one direction but are limited in their pivotal movement in the opposite direction to prevent the chain from sagging.

3. In a device of the character described, a sprocket wheel, and a chain mounted on said sprocket wheel, said chain being formed with pivotally mounted bars and turned-over link sections, said sprocket wheel being formed with a flange adapted to be engaged by said turned-over link sections for preventing the chain from moving laterally off of said sprocket wheel.

4. In a device of the character described, a sprocket wheel, and a chain mounted on said sprocket wheel, the links of said chain comprising pivotally mounted bars and a solid connecting member, said solid connecting member having over-hanging portions, whereby a grooved structure is presented, said sprocket wheel being formed with a flange arranged in line with the grooved portion of said links, whereby the chain is prevented from lateral movement.

5. In a device of the character described, a sprocket wheel, said sprocket wheel being formed with a toothed portion and a flanged portion, and a chain on said sprocket wheel with links engaging the toothed portion and over-hanging grooved portions engaging said flange.

6. In a device of the character described, a pair of sprocket wheels, and a chain mounted on said sprocket wheels, said chain being formed with links, each link having a pair of pivotally mounted bars and a solid connecting portion, said solid connecting portion having extensions overlapping said bars, whereby the links are permitted to bend in one direction but are held against bending or bowing in the opposite direction.

In testimony whereof I have signed my name to this specification in the presence of two subscribing witnesses.

CHARLES P. BROWNING.

Witnesses:
WILLIAM H. SHELDON,
JAMES C. BROWNING.

---

Copies of this patent may be obtained for five cents each, by addressing the "Commissioner of Patents, Washington, D. C."